Oct. 10, 1933.　　　　F. TWYMAN　　　　1,930,137
APPARATUS FOR VARYING ILLUMINATION
Filed Feb. 25, 1930　　　2 Sheets-Sheet 1
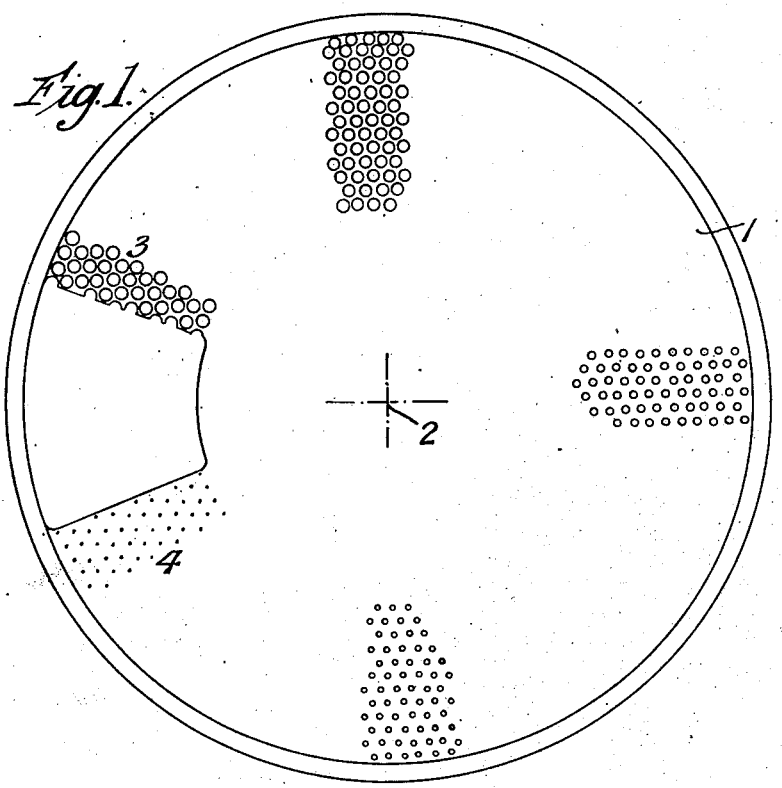
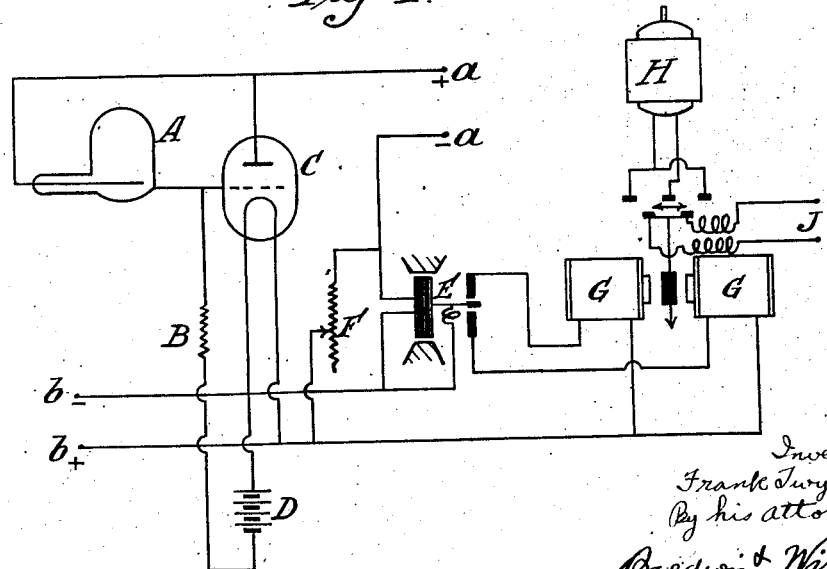

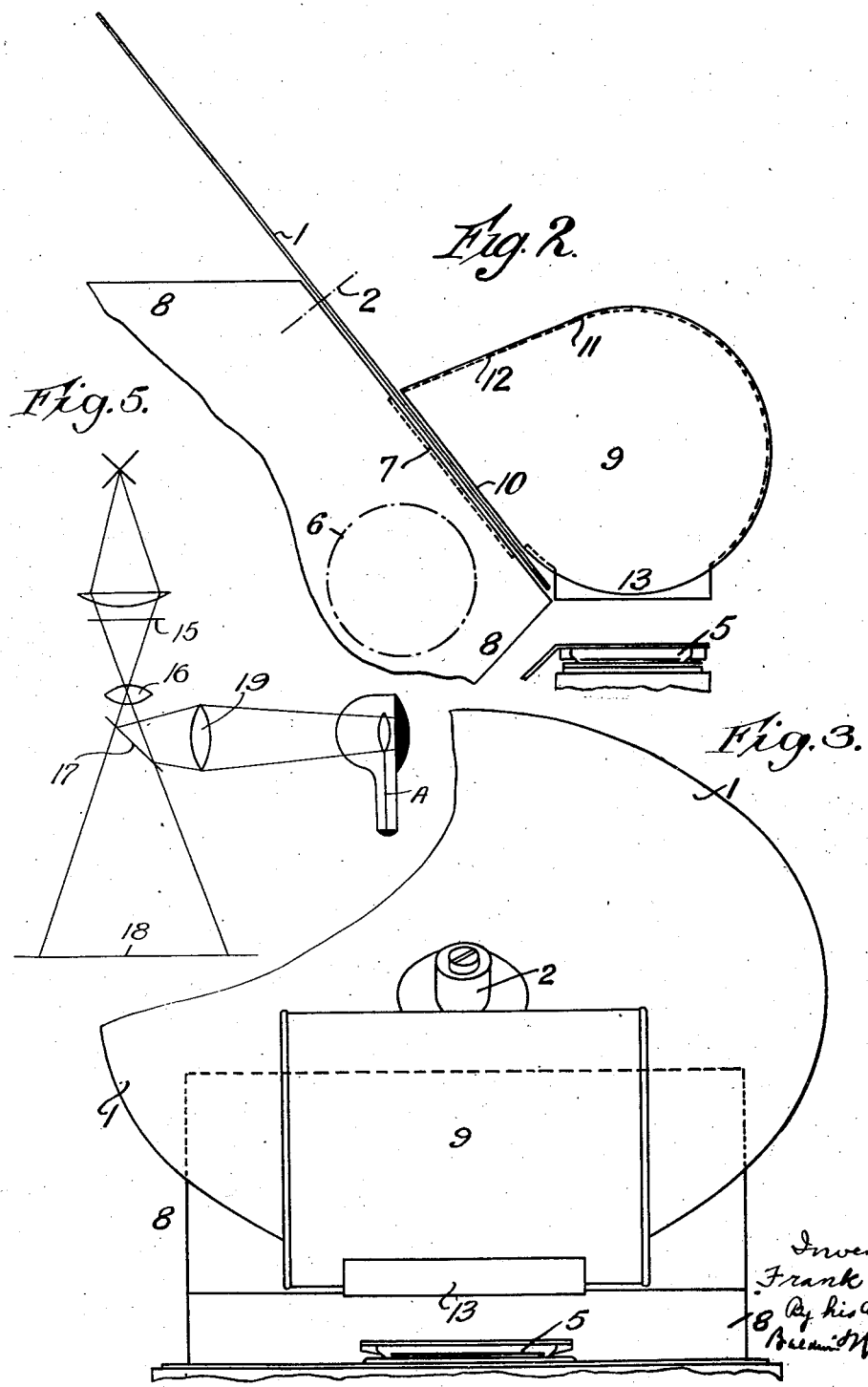

Patented Oct. 10, 1933

1,930,137

UNITED STATES PATENT OFFICE 1,930,137

APPARATUS FOR VARYING ILLUMINATION

Frank Twyman, London, England, assignor, by mesne assignments, to Eastman Kodak Company, Rochester, N. Y., a corporation of New York Application February 25, 1930, Serial No. 431,230, and in Great Britain February 26, 1929

10 Claims. (Cl. 88—24)

This invention relates to apparatus for varying illumination in a progressive manner. The principle used is that of subdividing a beam of light from a source of illumination into a plurality of beams and so progressively varying the number and/or cross-sectional area of such beams, that the total cross sectional area of the subdivided beams approaches the full area of the original beam.

This is effected, in accordance with the invention, by means of a screening device having distributed apertures and adapted to be interposed in the path of the beam of light and to be actuated so as to vary progressively the total cross-sectional area of the plurality of apertures through which the light passes. Thus, for example, an extended screen is provided whose surface is apertured to a progressively increasing or decreasing extent from one part to another and means are provided for displacing the screen relatively to the beam of light so as to interpose as desired a portion whose distributed apertures are of greater or less total cross-sectional area. The screen may accordingly be formed with apertures in uniform spaced relationship over the surface but progressively increasing or decreasing in size one part to another. Alternatively, the apertures may be of uniform size but progressively becoming more closely spaced along the screen.

The screen is conveniently in the form of a large disc rotatably mounted so that different portions of its surface can be interposed across the beam of light.

The invention is used in conjunction with a light diffuser when a variable diffused light is required, as in the case of a comparison source for a cube photometer, for visual spectrophotometry, for comparison of surface brightness of textiles, for photographic printing and enlarging and for other purposes. The screen is then interposed between the source of illumination and the light diffusing surface.

When used for varying the illumination of surfaces of varying reflective power or opacity, as for example in the case of photographic copying, printing and enlarging in sequence from a number of different originals or negatives, it is frequently required to regulate the light received from such surfaces. This would be required in photography to obtain correct exposure with a standard time of exposure for all originals or negatives. In the case of negatives a proportion of the light passing through may be reflected back, say by a transparent mirror, to a view finder where the negative would be viewed side by side with a comparison negative and an adjustment of the light is then rapidly made by varying the part of the screen used until the negative under treatment and the comparison negative appear to be of equal brightness.

Preferably provision is made for illuminating the comparison negative by a beam of light from the same source of illumination, such beam being arranged so that it does not pass through the screen device. In this way variations in the intensity of the source, due for example in the case of an electric lamp to variations in the supply voltage, have no effect on the standard of comparison.

According to a further feature of the invention means are provided for automatically varying the illumination falling on the negative or other surface by causing a portion of the light coming from such surface to impinge on a light sensitive device, such for example as a photoelectric cell, and by providing means such as relays to vary the portion of the screen interposed in the beam according as the response of the light sensitive device is greater or less than a predetermined amount.

The accompanying drawings show by way of example an embodiment of the invention.

Figure 1 is a template of a perforated disc, Figures 2 and 3 are side and front elevations respectively of such a disc in conjunction with the negative holder of photographic printing or enlarging apparatus, and Figure 4 is a diagram of connections showing a method of automatic control by a photoelectric cell, and Figure 5 is a diagrammatic showing of an apparatus for deflecting a part of the beam passing through a negative to a light sensitive device.

In Figure 1 the disc is shown at 1 rotatable about its centre 2. Perforations are made in the disc at equal distances. At 3 the perforations are as large as is compatible with the necessary strength of the disc and their size decreases gradually to 4 where the perforations are at their smallest. Only a few of the intermediate perforations are shown in the drawings.

Referring to Figures 2, 3, and 5, the negative holder is shown at 5, the printing or enlarging lens 16 being placed below the negative as shown in Figure 5. The source of light is 6 and the perforated disc 1 is placed near it. The light passes through an opening 7 in the light box 8 on to the holes 3, 4 of the disc which are opposite the opening at any time. The light thus subdivided into a plurality of beams enters the diffuser 9 by an opening 10 opposite the opening 7 of the light box 8. The diffuser 9 is a hollow cylindrical casing with closed ends and its interior surface is coated with dull white paint having a matt surface. The cylindrical surface terminates at 11 and is continued as a plane surface 12 to one boundary of the opening 10. This enables the diffuser to catch a greater amount of light and to reflect it more effectively. It will be seen that the opening 10 is also tangential to the cylindrical surface. A second opening 13 is formed in the lower part of the cylindrical wall opposite the negative holder 5, so that the diffused light reflected from the matt white inner surface of the cylinder passes through it and illuminates the negative under treatment. If the negative is thin the disc is rotated so that holes towards 4 are interposed between the openings 7 and 10, thus reducing the light. If on the other hand a dense negative is being used the disc is turned to bring holes towards 3 into use, the gradation of the holes providing a continuous gradation of the amount of light passed to suit any density of negative between the desired limits.

When this arrangement is used for printing or enlarging, the light after passing through the negative 15 will pass through the enlarging lens 16 and will then in part pass through a transparent mirror 17 to the printing surface 18 and in part will be reflected by the transparent mirror, the reflected part passing through a condensing lens 19, and impinging upon a photo-electric cell A or other light sensitive device to effect regulation of the intensity of illumination as will be described.

In the automatic form of construction this portion of the light falls on to a photo-electric cell or other device sensitive to light and a typical diagram of connections for this application is shown in Figure 4. In this diagram A is a photo-electric cell receiving part of the light transmitted by the negative. In series with this is the grid resistance B so that the photo-electric current due to the illumination on the cell under the influence of the high voltage applied to the terminals a a flows through the photo-electric cell A and the resistance B. The grid of a thermionic valve C is connected to the junction of the photo-electric cell cathode with the grid resistance B and consequently the potential of this point, apart from that due to the grid bias battery D depends on the magnitude of the photo-electric current. The photo-electric current is approximately proportional to the illumination and therefore the potential of the valve grid is dependent on the magnitude of the photo-electric current, which therefore influences the thermionic current through the valve C. The anode of the valve is connected to the positive of the high tension supply a a, while the filament is heated by low tension current from terminals b b. It will be seen from the diagram that the whole of the high tension current flows through the moving coil of a relay E. At the particular illumination chosen suitable for printing this relay E must be balanced and not close either of the secondary contacts. This can be achieved either by a mechanical zero setting or by opposing the high tension current by one of equal value. The first alternative is generally unsatisfactory, and the second can be arranged in either of two ways:—(1) by using a separate small battery in conjunction with a rheostat, or (2) by making use of the low tension supply to the valve. In the figure the second means is adopted. The magnitude of the opposing current is controlled by a rheostat F which therefore acts as an adjustment of the intensity to which the illumination is always brought.

Deviation of the light falling on the cell from the selected value causes the relay E to be deflected either one way or the other, with the result that the corresponding electro-magnet on a power relay G is energized. Suitable contacts are then closed, causing a controlling motor H supplied from mains J to revolve in one direction or the other, thus rotating the disc 1 so as to bring larger or smaller holes into use until the relay E is again balanced by the light falling on the cell A having attained its correct value.

It is clear that many other methods of carrying out the automatic regulation are possible. Thus for example other valves than the three electrode type may be used, a moving magnet may be used instead of a moving coil relay, and the adjustment of the perforated disc or equivalent device may be accomplished by solenoid or other means instead of using a motor.

What I claim is:—

1. Apparatus for varying the light from a source falling on surfaces of varying reflective power or opacity comprising in combination a disc rotatably mounted so that different portions of its surface can be interposed in the path of the light and having distributed apertures of progressively varying size, means automatically controlled by a photo-electric cell for rotating the disc, a diffusing surface receiving the light and retransmitting it to the first-named surfaces, and means for causing a portion of the light coming from the illuminated surfaces to impinge on the photo-electric cell.

2. Apparatus for providing varying illumination comprising in combination a source of light, a rotatable disc with perforations of progressively varying size, a diffusing surface receiving the light from the source passing through the part of the disc in use at any time, a holder for the object to be illuminated by said surface, a photo-electric cell receiving a part of the light transmitted from the object, and means operated by the cell for rotating the disc to equalize the response of the cell.

3. In apparatus for photographic printing from a succession of negatives which may vary substantially in mean density one from another and in which a constant time of exposure is employed, means for automatically adjusting the intensity of illumination of each successive negative in dependence upon the mean density thereof in order to produce a substantially constant degree of illumination of the printing surface, said means comprising means located between a source of light and the negative for diffusing the light falling on said negative, light controlling means for varying the amount of light incident upon said diffusing means, a light-sensitive device, means for subjecting said light-sensitive device to a proportion of the light passing through the negative and means operatively associated with said light-sensitive means for actuating said light controlling means.

4. In apparatus for photographic printing by projection from a succession of negatives which may vary substantially in mean density one from another and in which a constant time of exposure is employed, means for automatically adjusting the intensity of illumination of each successive negative in dependence upon the mean density thereof in order to produce a substantially constant degree of illumination of the printing surface, said means comprising a light diffusing surface located between a source of light and the negative for diffusing the light falling on said negative, light controlling means for varying the amount of light incident upon said diffusing surface, a light-sensitive device, means for subjecting said light-sensitive device to a proportion of the light passing through the negative and means operatively associated with said light-sensitive means for actuating said light controlling means.

5. In apparatus for photographic printing by projection from a succession of negatives which may vary substantially in mean density one from another and in which a constant time of exposure is employed, means for automatically adjusting the intensity of illumination of each successive negative in dependence upon the mean density thereof in order to produce a substantially constant degree of illumination of the printing surface, said means comprising a light diffusing surface located between a source of light and the negative for diffusing the light falling on said negative, light controlling means for varying the amount of light incident upon said diffusing surface, a light-sensitive device, means for deflecting towards said light-sensitive device a definite proportion of the light passing through the negative and means operatively associated with said light-sensitive means for actuating said light controlling means.

6. In apparatus for photographic printing from a succession of negatives which may vary substantially in mean density one from another and in which a constant time of exposure is employed, means for automatically adjusting the intensity of illumination of each successive negative in dependence upon the mean density thereof in order to produce a substantially constant degree of illumination of the printing surface, said means comprising means located between a source of light and the negative for diffusing the light falling on said negative, variable light screening means for varying the amount of light incident upon said diffusing means, a light-sensitive device, means for subjecting said light-sensitive device to a proportion of the light passing through the negative and means operatively associated with said light-sensitive means for actuating said variable light screening means.

7. In apparatus for photographic printing from a succession of negatives which may vary substantially in mean density one from another and in which a constant time of exposure is employed, means for automatically adjusting the intensity of illumination of each successive negative in dependence upon the mean density thereof in order to produce a substantially constant degree of illumination of the printing surface, said means comprising means located between a source of light and the negative for diffusing the light falling on said negative, an extended screen having apertures distributed over its surface in progressively varying density from one part to another and movably interposed between said light source and said light diffusing means for varying the amount of light incident upon said diffusing means, and a light-sensitive device subjected to light passing through the negative for controlling the position of said screen.

8. Apparatus as claimed in claim 5 and in which the extended screen is in the form of a disc having a multiplicity of apertures distributed over an annular area of said disc, said apertures being progressively and smoothly graded in size in a circumferential direction over said annular area.

9. In apparatus for photographic printing by projection from a succession of negatives which may vary substantially in mean density one from another and in which a constant time of exposure is employed, means for automatically adjusting the intensity of illumination of each successive negative in dependence upon the mean density thereof in order to produce a substantially constant degree of illumination of the printing surface, said means comprising means located between a source of light and the negative for diffusing the light falling on said negative, an extended screen having apertures distributed over its surface in progressively varying density from one part to another and movably interposed between said light source and said light diffusing means for varying the amount of light incident upon said diffusing means, and a photo-electric cell subjected to light passing through the negative for controlling the position of said screen.

10. Apparatus as claimed in claim 7 and in which the position of the light controlling screen is controlled by a thermionic valve relay whose control electrode is coupled to the photo-electric cell.

FRANK TWYMAN.